A. C. PROUDFIT.
COUPLING FOR ELECTRICAL CONDUITS.
APPLICATION FILED NOV. 24, 1902.

1,103,220. Patented July 14, 1914.

WITNESSES:

INVENTOR

UNITED STATES PATENT OFFICE.

ALEXANDER C. PROUDFIT, OF PRINCETON, NEW JERSEY.

COUPLING FOR ELECTRICAL CONDUITS.

1,103,220.

Specification of Letters Patent. Patented July 14, 1914.

Application filed November 24, 1902. Serial No. 132,507.

*To all whom it may concern:*

Be it known that I, ALEXANDER C. PROUDFIT, a citizen of the United States of America, and a resident of Princeton, in the county of Mercer and State of New Jersey, have invented certain new and useful Improvements in Couplings for Electrical Conduits, of which the following is a specification, like characters designating like parts in the accompanying drawings.

This invention has for its object the provision of a coupling by which the adjacent ends of pipes may be coupled in abutting relation, without the necessity for threading the ends of the pipes, an operation which necessitates undue time and expense when performed "on the job," especially in the case of electrical conduit for house wiring, to which therefore my invention is especially applicable, although it will be understood that I contemplate its utilization in any field for which my improvements are available by reason of their nature.

The various features of my invention will be illustrated and described fully in the accompanying drawings and specification.

Figure 1:
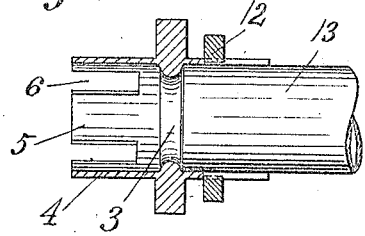
Figure 2:
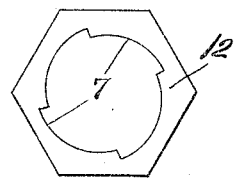
Figure 3:
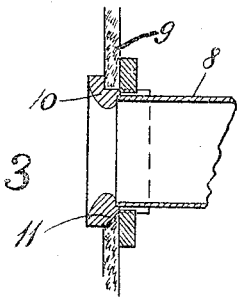
Figure 4:
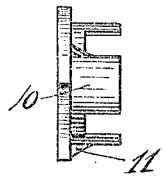
Figure 5:
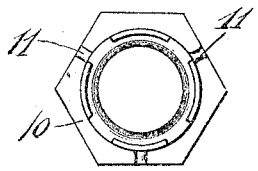

In the drawings, Figure 1 illustrates in vertical longitudinal section a coupling member in the construction of which my invention has been embodied; Fig. 2 is a face view of the cam nut; Fig. 3 is a view similar to Fig. 1 of my improvements as embodied in a coupling for outlet boxes; while Fig. 4 is a detail view of one of the members shown in Fig. 3; and Fig. 5 is an end view of the same.

In the embodiment of my invention selected for illustration and description as a convenient form to enable ready and complete understanding of my improvements, the reference numerals 4 and 3 designate respectively a pipe coupling and a medial interior device, shown as integral with the material of the coupling, taking the form of a shoulder presenting rounded surfaces toward each mouth of the coupling, and acting in accordance with my invention, to hold insulated wires or other contents of the conduit out of contact with the ends of the conduit pipes which are connected by the coupling. The ends of the coupling instead of being threaded, are split into a number of fingers 5, with intervening spaces 6, the ends thereby being rendered compressible, and in accordance with this important feature of my invention, compression members are provided, which may take conveniently the form of nuts having interior compressing means in the shape of cam surfaces 7, which enter the spaces 6, normally, but upon rotation of the nuts engage the fingers 5, and crowd them against the pipe ends respectively, completing the joint. The pipe-ends in completing the joint will be held in central position after coming into contact with the central shoulder which positions them exactly so as to receive the maximum retaining action of the fingers 5.

Fig. 3 may be considered to illustrate half a sleeve or coupling of the kind shown in Fig. 1, but is used to couple a pipe 8 to the apertured wall 9 of an outlet box or similar electrical conduit member, the aperture in which may be round, and in order to insure electrical connection between the parts, I have shown the sleeve or coupling device 10 as provided with wedge-like webs or shoulders 11, which, when the device is inserted within the aperture engage the walls thereof and preferably cut somewhat into the material.

Electrical connection between an outlet box and the conduit, &c., is usually provided to enable the current to find a speedy and good path to ground if there occurs a short circuit in the box, preventing a destructive result in the box or to the surroundings of the latter. It will be obvious that other means may be used to accomplish this electrical connection, which in the instance illustrated is maintained when the nut 12 has been tightened up upon the shaft 13, so that I do not limit myself, where provision is to be made for such electrical connection, to the specific form illustrated, nor in general otherwise than as set forth in the claims read in connection with this specification.

What I claim and desire to secure by Letters Patent is:—

1. A coupling for electrical conduit, said coupling comprising a member having split fingers to receive and clasp the conduit end; and in combination therewith a cam-nut constructed and arranged to surround said member, said nut having cam portions to enter between said split fingers and to be engaged compressively therewith, upon rotation of said nut thereabout.

2. A coupling device for electrical conduit; comprising a member having a shank divided into a plurality of separated compressible fingers to receive a pipe, and a cam-nut rotatable in its own plane upon and in engagement with said fingers, said nut having cam projections to enter between said fingers and serving upon rotation of said cam-nut to cause compression of said fingers to clamp said pipe; substantially as described.

ALEXANDER C. PROUDFIT.

Witnesses:
 F. A. HOPKINS,
 ELIZABETH PROUDFIT.